3,505,146
PROCESS FOR SEALING OF MULTILAYER
THERMOPLASTIC FILM
William H. Borough, Downey, Calif., assignor to The
Dow Chemical Company, Midland, Mich., a corporation of Delaware
Filed Sept. 17, 1965, Ser. No. 488,007
Int. Cl. B29c 17/00, 23/00
U.S. Cl. 156—273                                6 Claims

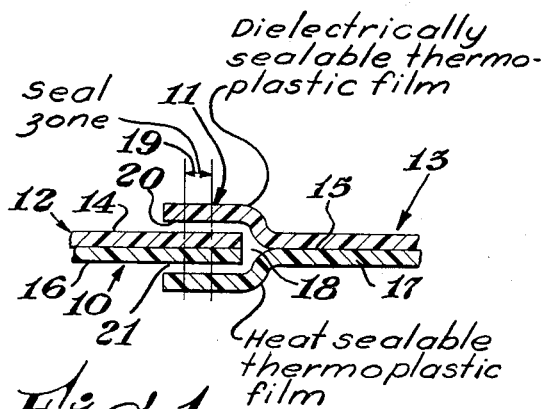
Fig. 1
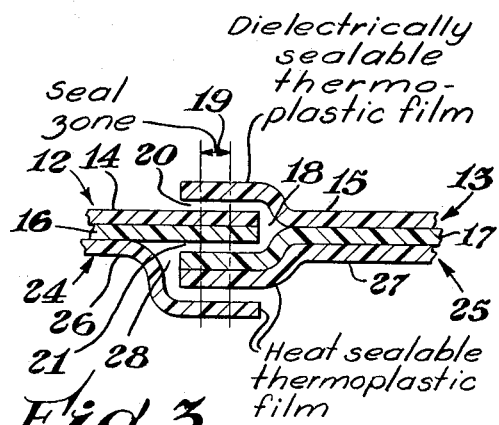
Fig. 3
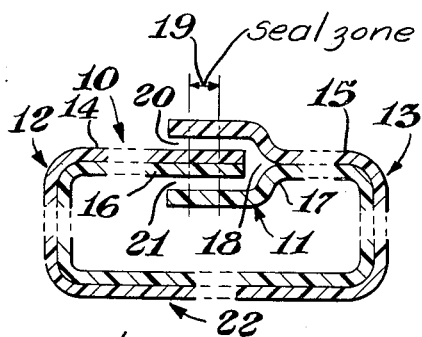
Fig. 2
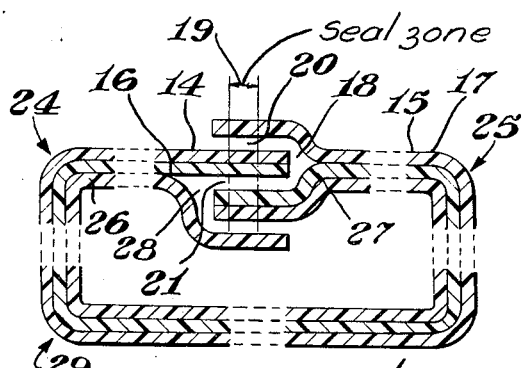
Fig. 4
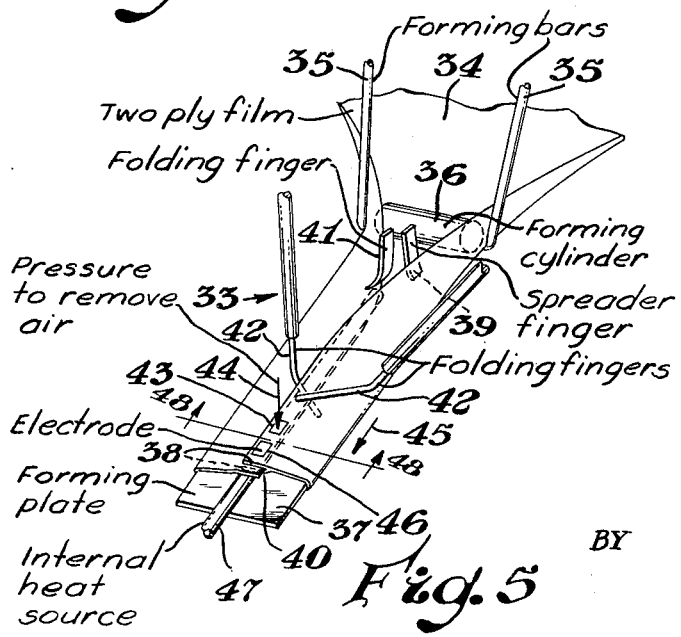
Fig. 5
Fig. 6
INVENTOR.
William H. Borough
BY
AGENT

United States Patent Office 3,505,146
Patented Apr. 7, 1970

ABSTRACT OF THE DISCLOSURE

A novel process is described whereby multi-layer thermoplastic film having two or more plies of a thermoplastic material which is heat sealable and two or more plies of a thermoplastic material which is dielectrically heat sealable is simultaneously sealed along an edge so that heat sealable plies are sealed to corresponding heat sealable plies and dielectrically heat sealable plies are sealed to corresponding dielectrically heat sealable plies.

---

This invention relates generally to an improved method and apparatus for sealing or bonding thermoplastic film, and has particular relation to such sealing or bonding by the application of heat, from various independant sources, to juxtaposed portions of tubuar articles prepared from multilayer sheet stock.

Among the objects of this invention are: to provide for sealing together interleaved edge portions of multi-layer thermoplastic film sections in a new and improved manner; to provide film structures of two or more plies or layers of a thermoplastic material which is dielectrically sealable and two or more plies or layers of thermoplastic material which is heat sealable, wherein edge portions of plies or layers of like thermoplastic film are interleaved in overlying juxtaposition; to form a tubular configuration using the multilayer thermoplastic films with the bonds between the respective layers extending lengthwise; to form the tubular configuration from multilayer thermoplastic sheet stock of indefinite length as a part of a continuous process with the interleaved plies or layers of dielectrically sealable material being continuously bonded together as a part of such process using high frequency energy, and with interleaved plies or layers of heat-sealable materials being independently bonded or sealed together by the application of heat supplied from a source located adjacent to the innermost surface of such seat-sealable layers; to separate an edge portion of the multilayer sheet stock as it moves toward the sealing zone to receive between the separated layer the unseparated layers of the opposite edge portion; and to apply pressure transversely of the interleaved edge portion in an amount and over a sufficient area to expel air from therebetween and provide surface contact engagement throughout the overlying layers.

In the drawing:

FIG. 1 is a cross-sectional view through interleaved edge portions of double ply or double layer thermoplastic films that are to be bonded together, the showing of the thickness of the films being at a greatly exaggerated scale in order to disclose more clearly the details of construction, it being understood that the individual films range in thickness from about .0004″ to .0600″.

FIG. 2 is a view, similar to FIG. 1, and showing how the edge portions can be the edge portions of a single multilayer sheet of plastic sheet or plastic film formed into a tubular configuration.

FIG. 3 is a view, similar to FIG. 1, showing how multilayer film having more than two plies or layers can be sealed together.

FIG. 4 shows the multilayer film as illustrated in FIG. 3 arranged in a tubular configuration.

FIG. 5 is a perspective view, somewhat diagrammatic in character, showing how the multilayer thermoplastic film can be continuously formed into a tubular configuration with the edge portions interleaved and how they are bonded or sealed together to form continuously a tubular configuration of indefinite length.

FIG. 6 is a cross-section along lines 48—48 of FIG. 5.

Referring now to FIG. 1, it will be observed that the reference characters 10 and 11 designate, generally, edge portions of double ply or double layer thermoplastic films that are indicated, generally, at 12 and 13. Each of the films 12 and 13 is formed of layers 14 and 15 of dielectrically sealable thermoplastic material which overlie layers 16 and 17, respectively, of thermoplastic heat-sealable film.

It will be understood that the layers 14, 15 and 16 and 17 have their thickness in the range above indicated. An example of a dielectrically sealable material of which the layers 14 and 15 can be formed in a normally crystalline polymer of vinylidene chloride, including the crystalline copolymers of vinylidene chloride and vinyl chloride. Other examples of dielectrically sealable thermoplastic films are polyvinyl chloride, polyethylene terephthalate, polyvinyl acetate, cellulose acetate, cellulose acetate butyrate, rubber hydrochloride, and polyamide. Examples of heat-sealable materials for the layers 16 and 17 are polyethylene, non-oriented polypropylene and polystyrene and tetrafluoroethylene.

Materials, such as a normally crystalline polymer of vinylidene chloride can be heated by the application thereto of high frequency energy. This energy may be in the form of electrical energy and the frequency may range from 10 to 200 megacycles per second. Also the energy can be in the form of sonic vibrations the frequency of which ranges from 20 to 50 kilocycles per second. Materials of this nature are referred to herein as being dielectrically sealable materials.

When the layers 16 and 17 are formed of thermoplastic film such as polyethylene, they cannot be readily sealed by the application of high frequency energy because of their relatively low dielectric loss factor. Herein such materials are referred to as heat-sealable since they can be sealed or bonded together by the application of heat thereto. In this regard, it has been found that when heat-sealing individual plies of polyethylene film in the manner described by the present invention, it is often desirable to subject such film plies to an inert gas heated to a temperature of between about 450° F. to 600° F., wherein such gas is applied directly to the film plies under a pressure of between about 1 and 10 pounds per square inch gauge.

It is desirable to combine the two types of film in order to obtain the individual characteristics of each and to provide a film which is more economical than is provided by the use of either a single film of double thickness or a double thickness of film of the same material. However, it will be understood that certain problems are presented when the sealing together of multiple thermoplastic films is undertaken.

In accordance with this invention, provision is made for sealing films of like material together. For this purpose the edge portions 11 of the double ply or layer 13 of thermoplastic material are separated as indicated at 18 and then the edge portion 10 of the double ply thermoplastic film 12 is inserted therebetween. In this manner the edge portions 10 and 11 have the respective films interleaved and the film of like material, i.e., the layers 14 and 15 and the layers 16 and 17, have their respective surfaces arranged for juxtaposition. After the layers have been interleaved, as shown in FIG. 1, transverse pressure is applied to the outermost layers to bring the inner surfaces into intimate contact engagement and to expel air that might otherwise be present. Thereafter the interleaved edge portions 10 and 11 are moved relative to a source of high frequency energy which is capable of generating heat in the edge portions of the layers 14 and 15 of dielectrically sealable thermoplastic film, while the interleaved portions 16 and 17 are moved relative to an internal heat source such as a perforated tube capable of discharging a hot gas. The sealing zone is indicated generally at 19 and, because of the application of the high frequency energy, a seal or bond is formed at 20 between the layers 14 and 15. It has been found, however, that the application of such high frequency energy generates heat in amounts which is often inadequate for the purpose of heat-sealing together the layers 16 and 17 of thermoplastic film having a relatively low dielectric loss factor. Such heat-sealable layers can be effectively and easily heat sealed together at 21, however, by the application of heat thereto from a source located adjacent the inner-most layer of such film and extending generally in the sealing zone 19.

In the manner described, two separate bonds or seals are formed, one at 20 and the other at 21, with the result that the layers 14 and 15 and the layers 16 and 17 are separately and individually bonded or sealed together. However, under the conditions outlined, no bond or seal is formed between the layers 14 and 16 in the seal zone 19. Accordingly, after the sealing or bonding operation has been completed, the layers 14 and 15 bonded or sealed together at 20 can be separated physically from the layers 16 and 17 bonded together at 21, if such separation is desired.

When the layers 14 and 15 are formed of a material having the characteristics of the layers 16 and 17, then sealing or bonding can be accomplished solely by the application of heat by conduction since the films are heat sealable. Under these circumstances, where the arrangement shown in FIG. 1 is used, all of the layers are sealed or bonded together in the seal zone 19. In such case they cannot be separated.

In FIG. 2 there is shown how the joint between the double ply or layer or thermoplastic films 12 and 13 can be utilized in the formation of a tubular configuration that is indicated, generally, at 22. Here it will be observed that the double ply or layers of thermoplastic films 12 and 13 in reality comprise a single double ply or double layer film, the broken lines indicating that the dimensions of the tubular configuration 22 can be varied as may be desired. It will be apparent that the tubular configuration 22 has the edge portions 10 and 11 joined together in the manner described for FIG. 1 and that the joint extends lengthwise of it. If desired, after the tubular configuration has been completed, the inner layers formed by the heat sealable layers 16 and 17 can be separated from the outer layer formed by the dielectrically sealable layers 14 and 15. While it is preferred to arrange the outer and inner layers of the materials as described, their positions can be reversed and the dielectrically sealable film can be the inner layer, providing such layers are subjected to the individual required sealing means as described herein.

The multiwall tubular configuration 22 can be employed for making various types of containers. For example, it can be used for the manufacture of bags in which various kinds of foods can be packed.

FIG. 3 shows how the triple ply or triple layers of thermoplastic film, indicated generally at 24 and 25, can be joined together. In addition to the double ply of double layers 12 and 13 of thermoplastic films additional layers 26 and 27 are applied in overlying relation to the layers 16 and 17 of material which may be either dielectrically sealable or heat-sealable. In FIG. 3 the layers 26 and 27 are indicated as being formed of a heat sealable material. For example they may be formed of polyethylene, polystyrene or tetrafluoroethyene. In addition to providing the separation at 18, an additional separation is provided at 28 in order to permit interleaving of the several layers of thermoplastic material so that layers of the same or like material can be juxtaposed in the seal zone 19. Thereafter the surfaces are brought into close contact engagement to exclude air and subsequently sealed in the manner as described herein.

FIG. 4 shows how the triple ply or triple layer thermoplastic film 24 and 25 can be employed to provide a tubular configuration that is indicated, generally at 29. As before, the broken lines indicate that the tubular configuration 29 can have different sizes, depending upon the desired cross-sectional area of the tubular configuration.

In FIG. 5 is shown, generally at 33, a preferred form of forming and sealing machine. For illustrative purposes the machine 33 is shown for forming and sealing a tubular configuration from a two ply film 34 which may have the characteristics of the double ply or double layers of thermoplastic films 12 and 13 shown in FIG. 1 and in tubular configuration in FIG. 2. The two ply or two layer film 34 is in the form of sheet stock of indefinite length. Preferably it is in a roll from which it can be unwound and it has a width depending upon the desired cross-sectional area of the final tubular product.

The two ply film 34 is withdrawn from the roll and its side portions are positioned between forming bars 35—35 with the intermediate portion being located underneath a forming cylinder 36 and also underneath a metallic elongated generally tubular forming plate 37.

In order to separate edge portions 38—38 to provide the separation indicated at 18 in FIG. 1, a spreader finger 39 is employed. Initially the edge portions 38—38 are separated and positioned on opposite sides of the lower end of the spreader finger 39 which is located with respect to the forming cylinder 36 to permit the double layer edge portion 40 to be inserted between the edge portions 38—38 or interleaved therewith. A folding finger 41 facilitates this action. Additional folding fingers 42—42 serve to assist in the interleaving action of the edge portion 40 between the edge portions 38—38, it being understood that the edge portion 40 corresponds to the edge portion 10 shown in FIG. 1. The interleaved edge portions then are brought under a pressure plate 43 to which a transverse pressure is applied as indicated by arrow 44 for the purpose of bringing the juxtaposed surfaces into good contact engagement and excluding air from the space therebetween.

The operation of the forming and sealing machine 33 is such that the two ply or two layer sheet stock material is continuously withdrawn from the roll and is moved in folded relation over the elongated metal forming plate 37 the cross-sectional area of which governs the internal dimension of the finished tubular configuration. The material is drawn in the direction indicated by the arrow 45 as a part of a continuous process.

Following the application of pressure by the pressure plate 43 the interleaved portions are moved over an internal heat source (illustrated herein as a perforated gas discharge tube 47) for the purpose of providing sufficient heat for the sealing of the heat-sealable layers, and underneath a metallic electrode 46 for the purpose of applying high frequency energy to the dielectrically sealable layers. Where the high frequency energy is in the form of electrical oscillations the metallic electrode 46 comprises one terminal while the elongated metal forming plate 37 comprises another terminal. These terminals are connected to a source of high frequency oscillations in conventional manner and the dielectric sealing action takes place between the dielectrically sealable films. The metallic electrode 46 is applied to the film under some pressure in order to facilitate the making of the bond or seal. A pressure of the order of 50 pounds per square inch can be employed for this purpose. This pressure can be in addition to or in lieu of the pressure applied to the pressure plate 43.

In FIG. 6 is shown, in cross-section along the line 48—48, the location of the internal heat source 47 in relation to the interleaved layers of the thermoplastic films 12 and 13.

In the event that it is desired to employ the triple ply thermoplastic film to make the tubular configuration 29 as shown in FIG. 4, the folding finger 41 is modified at its lower end to provide a spreader finger similar in construction to the spreader finger 39. With this modification when the triple layer thermoplastic film is moved through the forming and sealing machine 33, both edge portions are simultaneously separated to provide separations such as those indicated at 18 and 28 in FIG. 4. Thereafter the edge portions are interleaved as here shown and pressure is applied for removing any air that may be trapped. This is followed by the application of high frequency energy and pre-heated gas for the purpose of making the seal or bond in the manner described hereinbefore.

As many examples of the foregoing procedures and articles may be carried out and made, and as many modifications can be made in the procedures and articles described without departing from the scope of the subject invention, the foregoing is to be interpreted as illustrative only, and not as limiting the scope of the invention.

What is claimed is:

1. In the method of sealing together edge portions of dielectrically sealable and heat sealable plies of a multilayer thermoplastic film wherein said edge portions of plies of like film have been placed in overlying juxtaposition, the steps of
   (a) applying high frequency energy to the juxtaposed plies of dielectrically sealable film to generate heat and join them together, and
   (b) substantially simultaneously applying heat from a second separate and independent source to said heat sealable plies in an amount sufficient to heat seal them together.

2. The method of claim 1 wherein said edge portions are the corresponding sides of a multilayer thermoplastic film whereby a concentric tubular structure is formed.

3. The method of claim 1 wherein said dielectrically sealable plies are formed from a normally crystalline vinylidene chloride copolymer and said heat sealable plies are formed of polyethylene.

4. In the method of sealing together edge portions of dielectrically sealable and heat sealable plies of a multilayer thermoplastic film wherein said edge portions of plies of like film have been placed in overlying juxtaposition, the steps of
   (a) applying high frequency energy to the juxtaposed plies of dielectrically sealable film to generate heat and join them together, and
   (b) substantially simultaneously applying heat in the form of a hot gas to said heat sealable plies and join them together.

5. The method of claim 4 wherein said dielectrically sealable plies are formed from a normally crystalline vinylidene chloride copolymer and said heat sealable plies are formed of polyethylene.

6. The method of claim 5 wherein said gas is heated to a temperature of between 450° F. and 600° F. and applied to said polyethylene at a pressure of between about 1 and 10 pounds per square inch gauge.

References Cited

UNITED STATES PATENTS

| 2,367,725 | 1/1945 | Lindh et al. | 156—306 |
| 2,706,165 | 4/1955 | Korsgaard | 156—274 |
| 3,026,233 | 3/1962 | Scholl et al. | 156—251 |

DOUGLAS J. DRUMMOND, Primary Examiner

U.S. Cl. X.R.

156—285